United States Patent
Kline et al.

(10) Patent No.: US 11,041,733 B2
(45) Date of Patent: Jun. 22, 2021

(54) DETERMINING A PICKUP LOCATION FOR A VEHICLE BASED ON REAL-TIME CONTEXTUAL INFORMATION

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/166,612

(22) Filed: Oct. 22, 2018

(65) Prior Publication Data
US 2020/0124427 A1   Apr. 23, 2020

(51) Int. Cl.
| | |
|---|---|
| G01C 21/34 | (2006.01) |
| G05D 1/00 | (2006.01) |
| G07C 5/00 | (2006.01) |
| G01C 21/32 | (2006.01) |
| G06F 16/29 | (2019.01) |

(52) U.S. Cl.
CPC ......... *G01C 21/3438* (2013.01); *G01C 21/32* (2013.01); *G01C 21/3461* (2013.01); *G01C 21/3484* (2013.01); *G05D 1/0088* (2013.01); *G06F 16/29* (2019.01); *G07C 5/008* (2013.01); *G05D 2201/0213* (2013.01)

(58) Field of Classification Search
CPC ................................................ G01C 21/3438
USPC ....................................................... 701/410
See application file for complete search history.

(56) References Cited

U.S. PATENT DOCUMENTS

| | | |
|---|---|---|
| 9,373,149 B2 | 6/2016 | Abhyanker |
| 9,411,160 B2 | 8/2016 | Hosoya |
| 2015/0187019 A1* | 7/2015 | Fernandes .............. G06Q 40/08 705/4 |
| 2015/0377635 A1 | 12/2015 | Beaurepaire et al. |
| 2016/0364823 A1* | 12/2016 | Cao ......................... G06Q 50/30 |

(Continued)

FOREIGN PATENT DOCUMENTS

WO    2016183525 A1    11/2016

OTHER PUBLICATIONS

Google Patents Translation of International Patent Application Pub. No. WO 2018/1499479 to Wen Guan that published on Aug. 2018 (hereinafter "Guan").*

(Continued)

*Primary Examiner* — Jean Paul Cass
(74) *Attorney, Agent, or Firm* — Cantor Colburn LLP; Tihon Poltavets

(57) ABSTRACT

A computer-implemented method includes capturing an original image. In the original image, a plurality of potential pickup locations are identified. Each potential pickup location of the plurality of potential pickup locations is associated with a respective metadata set of a plurality of metadata sets. An annotated image is generated based on the original image, where the annotated image indicates the plurality of potential pickup locations and the respective metadata set associated with each potential pickup location. A selection of a pickup location, from among the plurality of potential pickup locations, is received. The pickup location is transmitted to a remote server to facilitate a ride beginning at the pickup location.

20 Claims, 4 Drawing Sheets

(56) References Cited

U.S. PATENT DOCUMENTS

| | | | | |
|---|---|---|---|---|
| 2016/0370194 | A1* | 12/2016 | Colijn | G08G 1/22 |
| 2017/0021764 | A1* | 1/2017 | Adams | G07C 5/0825 |
| 2017/0083967 | A1* | 3/2017 | Shiely | G06Q 30/0641 |
| 2017/0153714 | A1 | 6/2017 | Gao et al. | |
| 2017/0200321 | A1* | 7/2017 | Hummel | G06Q 30/0611 |
| 2018/0209804 | A1* | 7/2018 | Rakah | B60N 2/002 |
| 2018/0276875 | A1* | 9/2018 | Pylvaenaeinen | G06T 3/4038 |
| 2019/0017839 | A1* | 1/2019 | Eyler | G02B 27/0101 |
| 2019/0033085 | A1* | 1/2019 | Ogale | G06N 3/008 |
| 2019/0034794 | A1* | 1/2019 | Ogale | G01C 21/3407 |
| 2019/0047695 | A1* | 2/2019 | Boudville | H04L 67/025 |
| 2020/0151291 | A1* | 5/2020 | Bhattacharyya | G06N 3/08 |

OTHER PUBLICATIONS

Authors et al.: Disclosed Anonymously, "Self-Driving Cars Able to Avoid Damage or Inconvenience (to Itself or the User) Due to Inclement Weather", An IP.com Prior Art Database Technical Disclosure, Jan. 15, 2017, IPCOM000249003D, 3 pgs.

App Store Preview "Uber Technologies, Inc ." retrieved at: https://apps.apple.com/us/app/uber/id368677368; dated Jan. 14, 2020;1 pg.

Brewster, Signe "Go for a Ride in Uber's Autonomous Car", retrieved at https://techcrunch.com/video/go-for-a-ride-in-ubers-autonomous-car/?renderMode=ie11; dated Sep. 14, 2016; 12 pgs.

Farrell, Nick "Uber experimental autonomous taxis pick up real people", retrieved from https://www.fudzilla.com/news/41615-uber-experimental-autonomous-taxis-pick-up-real-people; dated Sep. 15, 2016; 6 pgs.

Solomon, Brian "Uber's Self-Driving Cars Will Pick Up Passengers in Pittsburgh", retrieved from http://www.forbes.com/sites/briansolomon/2016/08/18/ubers-self-driving-cars-will-pick-up-passengers-in-pittsburgh/#660a64726472; dated Aug 18, 2016; 3 pgs.

* cited by examiner

DETERMINING A PICKUP LOCATION FOR A VEHICLE BASED ON REAL-TIME CONTEXTUAL INFORMATION

BACKGROUND

The present invention relates to rideshares and autonomous vehicles and, more specifically, to determining a pickup location for a vehicle based on real-time contextual information.

Rideshare applications exist to connect drivers with riders. Generally, a rideshare application allows a user to select a pickup location and a drop-off location at the time of requesting a ride. This information is transmitted to a server, which connects the user with a driver who is using a driver version of the rideshare application. Through the rideshare application, the driver receives the user's selected pickup and drop-off locations.

Autonomous vehicles have recently come into use, and some are still being improved or developed. In the case of an autonomous cab, similar to a rideshare service, a user would select a pickup location and a drop-off location when requesting a ride. The autonomous cab would then proceed to the pickup location to acquire the user.

SUMMARY

Embodiments of the present invention are directed to a computer-implemented method for determining a pickup location. A non-limiting example of the computer-implemented method includes capturing an original image. In the original image, a plurality of potential pickup locations are identified. Each potential pickup location of the plurality of potential pickup locations is associated with a respective metadata set of a plurality of metadata sets. An annotated image is generated based on the original image, where the annotated image indicates the plurality of potential pickup locations and the respective metadata set associated with each potential pickup location. A selection of a pickup location, from among the plurality of potential pickup locations, is received. The pickup location is transmitted to a remote server to facilitate a ride beginning at the pickup location.

Embodiments of the present invention are directed to a system for determining a pickup location. A non-limiting example of the system includes a memory having computer-readable instructions and one or more processors for executing the computer-readable instructions. The computer-readable instructions include capturing an original image. Further according to the computer-readable instructions, a plurality of potential pickup locations are identified in the original image. Each potential pickup location of the plurality of potential pickup locations is associated with a respective metadata set of a plurality of metadata sets. An annotated image is generated based on the original image, where the annotated image indicates the plurality of potential pickup locations and the respective metadata set associated with each potential pickup location. A selection of a pickup location, from among the plurality of potential pickup locations, is received. The pickup location is transmitted to a remote server to facilitate a ride beginning at the pickup location.

Embodiments of the invention are directed to a computer-program product for determining a pickup location, the computer-program product including a computer-readable storage medium having program instructions embodied therewith. The program instructions are executable by a processor to cause the processor to perform a method. A non-limiting example of the method includes capturing an original image. Further according to the method, a plurality of potential pickup locations are identified in the original image. Each potential pickup location of the plurality of potential pickup locations is associated with a respective metadata set of a plurality of metadata sets. An annotated image is generated based on the original image, where the annotated image indicates the plurality of potential pickup locations and the respective metadata set associated with each potential pickup location. A selection of a pickup location, from among the plurality of potential pickup locations, is received. The pickup location is transmitted to a remote server to facilitate a ride beginning at the pickup location.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
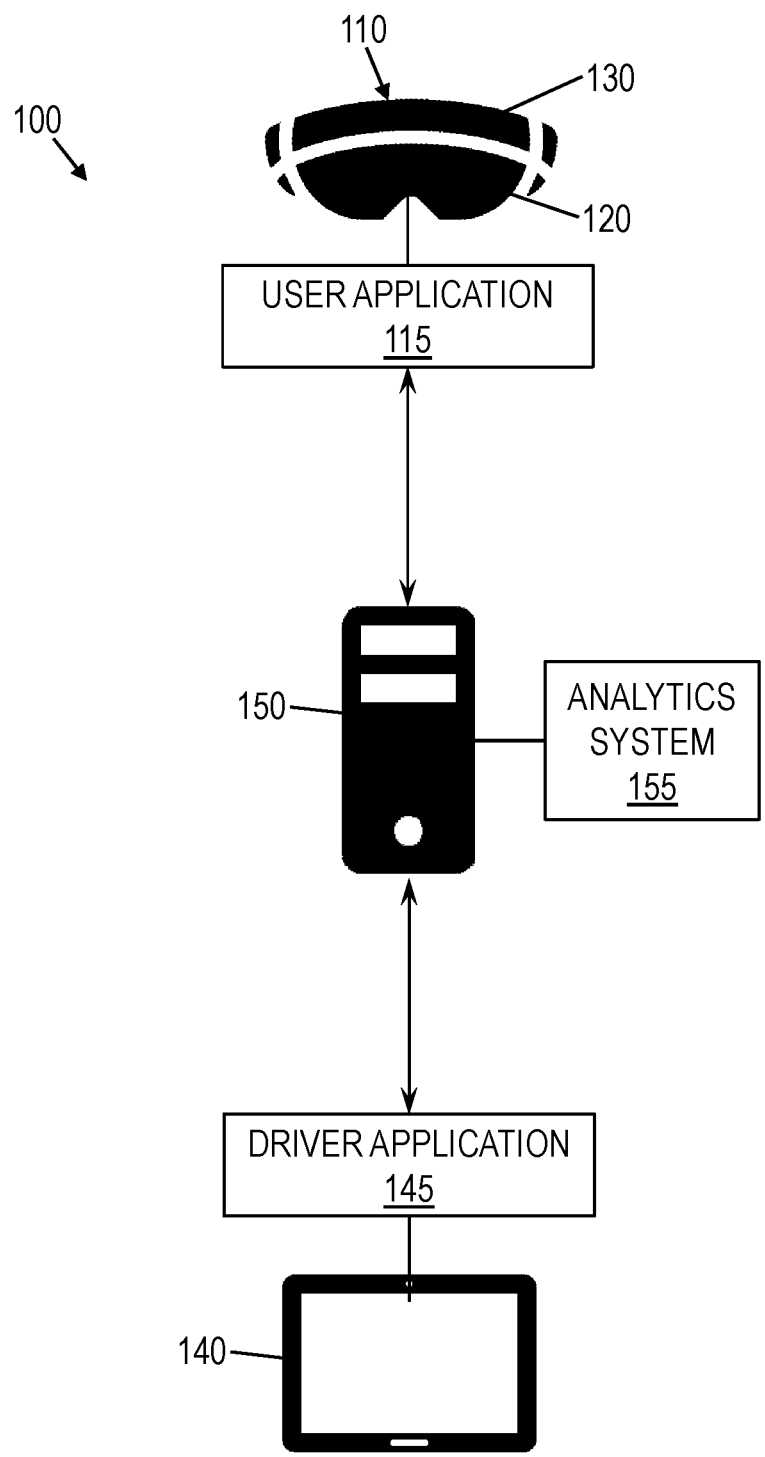
FIG. 1 is a diagram of a selection system for determining a pickup location based on real-time contextual information, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, sometimes difficulty arises in determining an appropriate pickup location. For instance, a user may not know the best location for a pickup that is near his or her present location. This may be the case, for example, if traffic is heavy at the user's location, or if the user is in an area where vehicles are not allowed. Generally, in such cases, the user would have to search a map provided by a rideshare application in order to select a location, and the map would not show complete information, such as traffic, weather, and vehicle allowance. As a result, if the driver arrives and finds that he or she cannot reach the user, the driver and the user have to connect by way of phone or messaging to select a new pickup location. This is a time-consuming and inconvenient process for both parties, and in some cases, the ride request ends up being canceled when one party or the other decides that finding a meeting a location is too difficult.

Turning now to an overview of the aspects of the invention, one or more embodiments of the invention address the above-described shortcomings of the prior art by providing a mechanism enabling the user to intelligently select a pickup location based on real-time contextual information. In some embodiments of the invention, a mobile device, such as a head-mounted display or a smartphone, captures an image or a series of images of the user's surroundings. Based on static and dynamic metadata available about the area within the field of view of the mobile device, embodiments of the invention augment the captured image with the static and dynamic metadata. Thus, the user can intelligently select a pickup location. Further, in some embodiments of the invention, the driver is enabled to participate in the selection process as well. In that case, the driver may also view the augmented image of the user's surrounding, and the driver and the user can thereby negotiate a pickup location that is mutually agreeable.

The above-described aspects of the invention address the shortcomings of the prior art by enabling providing situational awareness to the user, thus enabling the user to intelligently select a pickup location based on contextual information. Because embodiments of the invention use static and dynamic metadata to describe each potential pickup location, the pickup location can be optimized according to the needs of the user and the driver, which provides a smoother onboarding process.

Turning now to a more detailed description of aspects of the present invention, FIG. 1 is a diagram of a selection system 100 for determining a pickup location based on real-time contextual information, according to some embodiments of the invention. As shown in FIG. 1, in some embodiments of the invention, the selection system 100 runs at least in part on a user device 110, having a display 120 and a camera 130. The user device 110 may execute a user application 115 of the selection system 100, where the user application 115 enables the user to request a ride beginning at a selected pickup location. Additionally, the selection system 100 may run at least in part on a driver device 140, which may execute a driver application 145. The driver application 145 may receive instructions to pick up the user responsive to a ride request and, in some embodiments, may enable participation in the selection of the pickup location. The selection system 100 may additionally include a server 150, which may be remote from the user device 110 and the driver device 140, and which performs centralized processing and facilitates communications between the user application 115 and the driver application 145. The server 150 may include an analytics engine 155, which analyzes one or more images of the user's surroundings to provide contextual information as needed. Generally, the server 150 may manage rides for a plurality of users and a plurality of drivers, where each user (i.e., rider) utilizes an instance of the user application 115 and each driver utilizes an instance of the driver application 145.

The user device 110 may be one of various computing devices, or may be a combination of devices, having or utilizing both a display 120 and a camera 130 or other image-capture device. For example, and not by way of limitation, the user device 110 may be a smartphone, a tablet, a smartwatch, or a head-mounted display, such as a headpiece or digitizing glasses. In some embodiments of the invention, the user device 110 is capable of capturing an image of a user's surroundings, performing processing as described herein, and overlaying textual or graphical annotations onto that image while presenting the image to the user. Thus, one of skill in the art will understand that some devices not mentioned herein may be utilized for embodiments of the invention.

The driver device 140 may be a computing device utilized by a driver of a vehicle performing the pickup. The controller may be human or automated. For example, and not by way of limitation, the driver device 140 may be integrated into an autonomous vehicle, or the driver device 140 may be a smartphone or tablet of a human driver of a vehicle. In the former case, upon receiving the pickup location, the autonomous vehicle may direct itself to the pickup location. In the latter case, upon receiving the pickup location through the driver device 140, the human driver can direct the vehicle to the pickup location. Thus, embodiments of the invention support pickups by both autonomous vehicles and human-driven vehicles.

Generally, through the user application 115 on the user device 110, the selection system 100 shows the user metadata about potential pickup spots within the field of view of the user device 110 and thus, typically, within the field of view of the user. As such, the user can make an intelligent selection of a pickup location. Upon receiving the selection, the user device 110 may transmit the selection to the server 150, which may be located remotely from the user device 110. The server may then communicate the pickup location to the driver device 140, which may then cause the vehicle to be directed to the pickup location (e.g., autonomously or driven by a human driver).

Figure 2A:
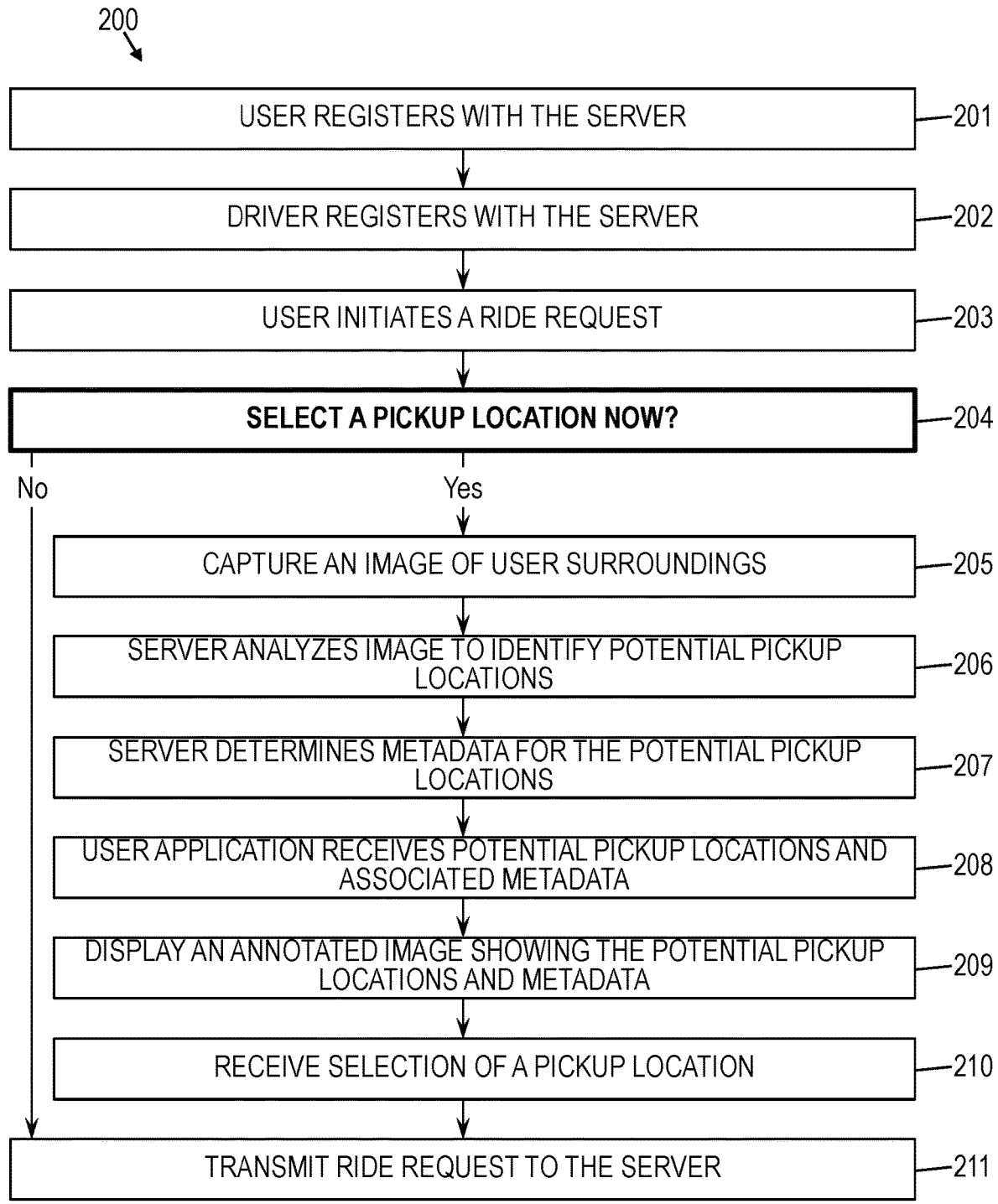
FIGS. 2A-2B together are a flow diagram of a method of determining a pickup location with the selection system, according to some embodiments of the invention.
Figure 2B:
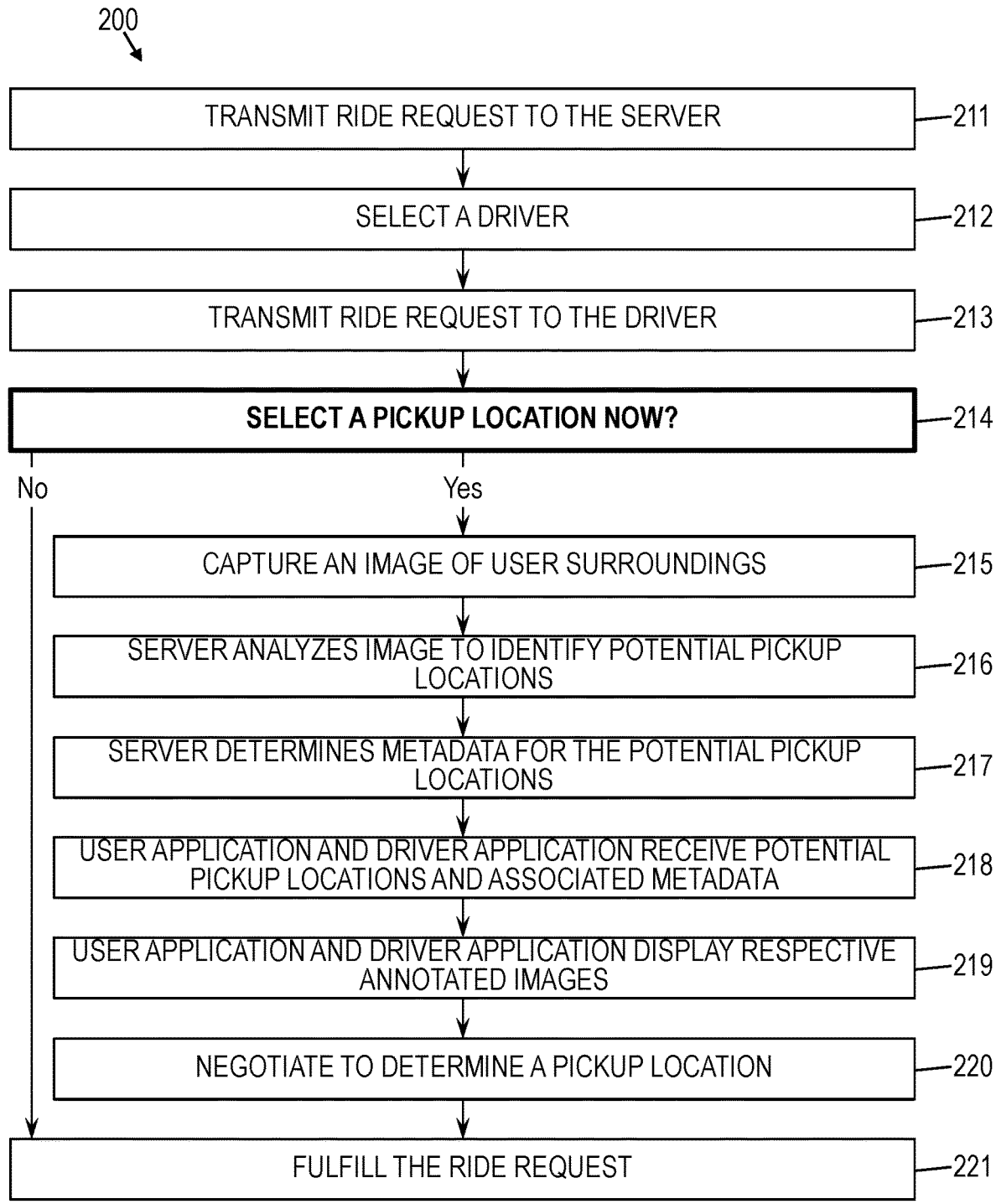

FIGS. 2A-2B together are a flow diagram of a method 200 of determining a pickup location with the selection system, according to some embodiments of the invention. Generally, this method 200 or similar may be used to connect a user with a driver for the purpose of a ride, particularly by determining an appropriate pickup location. It will be understood by one skilled in the art that this method 200 is illustrative only and does not limit the scope of embodiments of the invention.

At block 201, a user registers with the server 150. This may be facilitated by the user application 115. For instance, the user may register with the user application 115, which may communicate with the server 150 to register the user with the server 150. During registration, the user may provide to the server 150, by way of the user application 115, various information about himself or herself, such as payment information to pay for rides. Additionally, during registration, the user may indicate to the server 150 information relevant to pickup up the user for rides, such as an individual requiring assistance or an environmental concern. In some embodiments of the invention, the user application 115 may enable the user to modify this information as needed.

At block 202, the driver registers with the server 150. This may be facilitated by the driver application 145. For instance, the driver may register with the driver application 145, which may communicate with the server 150 to register the driver with the server 150. During registration, the driver may provide to the server 150, by way of the driver application 145, various information about the driver, such as the following, for example: bank information to receive payments for rides, type of vehicle, color of the vehicle, license plate number, vehicle identification number, default number of available seats, or dimensions of the vehicle. In some embodiments of the invention, the driver application 145 may enable the driver to modify this information as needed.

In some embodiments of the invention, block 201 and block 202 represent initialization steps that need only be performed once. Specifically, the user need only register once with the user application 115 and thus with the server 150, and the driver need only register once with the driver application 145 and thus with the server. Further, in some embodiments of the invention, the driver is an autonomous vehicle, and in that case, registration may occur automatically or may have been performed prior to commissioning of the autonomous vehicle. In that case, block 202 may be skipped. However, in some embodiments of the invention, both the user and the driver must be known to the server 150 before a ride can be arranged between the two.

At block 203, through the user application 115, the user initiates a ride request. The ride request may include various information supplied by the user, by the user device 110, or a combination of both. For example, and not by way of limitation, the ride request may include one or more of the following: number of seats needed in a vehicle, whether the ride will include kids or an individual requiring assistance, whether the user has baggage to be included in the ride, drop-off location, and current location. In some embodiments of the invention, the drop-off location, if included in the ride request, need not be final and can be changed by the user either in person, through communication with the driver at a later point, or through the user application 115 at a later point. Further, in some embodiments of the invention, the user application 115 may determine the current location based on a detected location (e.g., a global positioning system (GPS) location) of the user device 110.

At decision block 204, it is be determined whether the user would like to select a pickup location at this time. If the user does not indicate a desire to select a pickup location at this time, then the method 200 may proceed to block 211, and in that case, the current location may be used, at least temporarily, as a pickup location.

At block 205, the user device 110 captures at least one image of the user's surroundings, and the user application 115 transmits that image to the server 150. In some embodiments of the invention, the image provides a panoramic view, which may encompass the whole of the user's field of view, including the user's peripheral vision. For example, and not by way of limitation, the image may encompass at least 130 degrees around the user or may encompass a full 180 degrees in front of the user. As mentioned above, the user device 110 may be a head-mounted display, such as an augmented-reality headset or digitizing glasses. In that case, the captured image may be a panorama. If the user device is a smartphone, tablet, or smartwatch, for example, then one or more images may be taken and transmitted to the server 150. For instance, a single image may be taken in panorama mode, so as to achieve a wide field of view, or multiple images may be taken such that, together, the multiple images provide a panorama. In some embodiments of the invention, the image is a moving image, specifically a video. Thus, the operations described below as being performed on the image may be performed on a series of images that together form a streaming video.

At block 206, the analytics engine 155 at the server 150 analyzes the image to identify one or more potential pickup locations in the image. More specifically, for instance, the analytics engine 155 may analyze the image contextually, such as by comparing the image to one or more maps based in part on the current location of the user. The one or more maps may be maintained on the server 150, for instance, and the maps may indicate a plurality of known potential pickup locations. As a result of analyzing the image, the server 150 may be able to more precisely determine the user's current location and, further, may determine which points in the image corresponding to potential pickup locations.

The maps utilized may include existing annotations, such that a plurality of potential pickup locations in the maps are each associated with respective metadata providing details about that potential pickup location. The metadata may include both static and dynamic metadata. Thus, at block 207, upon determining which potential pickup locations are visible in the image, the server 150 determines metadata associated with each such potential pickup location. For each potential pickup location, this metadata may include static metadata or dynamic metadata, or both. Static metadata may be metadata that does not change or changes infrequently, such as, for example, assisted accessibility, applicable traffic laws, directional traffic flow, or allowed stopping time. Thus, determining the static metadata for a potential pickup location may involve simply identifying the static metadata that is known to be associated with the potential pickup location.

Dynamic metadata may be metadata that changes frequently and may include, for example, weather conditions, traffic, event information, or temporary blockages. In some embodiments of the invention, upon determining that a potential pickup location is shown in the image, the server 150 may update the dynamic metadata associated with that potential pickup location. Updating dynamic metadata may involve, for example, contacting a third-party server that maintains information like the metadata in question. For example, to update dynamic metadata describing weather conditions, the server 150 may communicate with a web service that provides weather-related data to obtain the current weather at the current location of the user.

At block 208, the server 150 transmits to the user application 115 indications of the potential pickup locations shown in the image as well as the associated metadata. This may include both the static and dynamic metadata. For example, and not by way of limitation, for each potential pickup location in the image, the server 150 may transmit coordinates corresponding to the outer bounds of the potential pickup location within the image, as well as the metadata associated with the potential pickup location.

At block 209, the user application 115 displays the potential pickup locations and metadata to the user, such as through an annotated image. In some embodiments of the invention, the annotated image is displayed to the user through the user application 115. Further, as described above, with respect to the image originally captured, the annotated image may be a panorama and, further, may be a video.

Generally, the annotated image may be an annotated version of the image transmitted to the server 150. The annotated image may be dynamic, in that the annotations may change based on the user's interactions with the annotated image. In some embodiments of the invention, the user application 115 may dynamically generate and update the annotations shown in the annotated image 115 according to user interactions.

The annotated image may highlight all or a subset of the potential pickup locations in the annotated image. The highlighting may take various forms, such as superimposing color overtop a potential pickup location or adding a colored border to the potential pickup location. Additionally, proximate the coordinates of each potential pickup location, the annotated image may display, in a text form, for example, all or a portion of the metadata for the respective potential pickup location. The metadata may describe useful information about the potential pickup location and may thus be useful to the user in determining which potential pickup location to use.

User interaction with the annotated image may change which metadata is displayed. For example, and not by way of limitation, the metadata may be categorized, and through the user application 115, the user may select a desired category. Thus, the user application 115 may display on the annotated image, for each potential pickup location, the metadata belonging to a selected category. For another example, when the user focuses on or tentatively selects, a particular potential pickup location (e.g., by way of a finger gesture, and arm gesture, or an eye gesture), all the metadata for that potential pickup location may be displayed on the annotated image.

In some embodiments of the invention, the annotated image indicates that one or more of the potential pickup locations are recommended, based on contextual information, such as information about the user and the ride request and such as metadata describing the potential pickup locations. For instance, a recommended potential pickup location may be highlighted in an emphasized fashion (e.g., in a different color, in a more saturated color) as compared to other potential pickup locations. For another example, a level of recommendation may be associated with each potential pickup location and indicated in the annotated image. For instance, a level of saturation of a color superimposed over each potential pickup location may correspond to the respective recommendation level. In some embodiments of the invention, recommendations are determined by the server 150 and communicated to the user application 115, but additionally or alternatively, the user application 115 may locally determine recommendations.

For instance, recommendations may be based on ease for the user of reaching the potential pickup location. More specifically, for example, recommendations may be based on one or more of the following: estimated time for the user to reach the potential pickup location, whether a street has to be crossed to reach the potential pickup location, the current traffic on each street that needs to be crossed, the proximity of crosswalks for crossing any street that needs to be crossed, obstacles that need to be navigated on the route to the potential pickup location, weather shields between the user's current location and the potential pickup location, whether the user has luggage that would need to be carried with the user to the potential pickup location, length of time available for loading or onboarding at the potential pickup location, whether assisted accessibility is available, whether there exists an indoor waiting area for the potential pickup location or other factors.

The weight of each factor may be based on information known about the user or information in the ride request. For example, if the ride request indicates that assisted accessibility is required of that heavy baggage is present, then assisted accessibility may be given a high weight in determining recommendations; or if the ride request indicates that a child is participating in the trip, then existence of an indoor waiting area may be weighted heavily; or if the ride request indicates baggage and children are along for the ride, then allowed stopping time may be given a high weight. In some embodiments of the invention, a scoring algorithm is used to score, and thereby rank, each potential pickup location shown in the image. Each resulting score may correspond to a respective recommendation level. One or more of the top scoring potential pickup locations may be deemed most recommended.

In some embodiments of the invention, recommendations may be grouped and displayed based on groupings. For example, and not by way of limitation, a first set of the potential pickup locations may be highly recommended and may thus be assigned to a first group, a second set of the potential pickup locations may be moderately recommended and may thus be assigned to a second group, and a third set of potential pickup locations may not be recommended and may thus be assigned to a third group. If groups are used, then potential pickup locations may be placed in groups based on scoring, which may be calculated based on a scoring algorithm. In some embodiments of the invention, the groups can be indicated to the user in the annotated image. For instance, the groups may be indicated graphically, such as by color-coding or pattern-coding based on recommendation level. For example, and not by way of limitation, potential pickup locations in the highly recommended group may be highlighted green, potential pickup locations in the moderately recommended group may be highlighted yellow, and potential pickup locations in the unrecommended group may be highlighted red.

In some embodiments of the invention, blocks 205 through 209 of FIG. 2A, are performed in real time, thus providing an augmented reality. When the user moves, thereby pointing the camera 130 of the user device 110 in a different direction, then blocks 205 through 209 may be repeated to present an updated annotated image to the user application 115 in real time, or near real time.

At block 210 of FIG. 2A, the user may select a potential pickup location as the pickup location to be used for the ride request, and the user application 115 may receive that selection. The selection may be made by many mechanisms, depending at least in part on the capabilities of the user device 110. Generally, the act of making the selection may indicate coordinates of the potential pickup location within the annotated image. For instance, a selection of a potential pickup location may be made through an eye gesture, arm gesture, or finger gesture that indicates a position in the annotated image that corresponds to the placement of the potential pickup location being selected. For example, and not by way of limitation, if the display 120 is a touchscreen, a selection may be made by touching the position at which a potential pickup location is shown and holding that touch for a full second.

At block 211, which appears on both of FIG. 2A and FIG. 2B, the user application 115 transmits the ride request to the server 150, including the pickup location. If the user opted to select a pickup location, then the selected pickup location may be included in the ride request. However, if the user did not yet opt to select a pickup location, then the current location of the user device 110 may be included in the ride request as the pickup location.

At block 212 of FIG. 2B, the server 150 selects a driver for the user's ride request. This may be performed in various ways. In some embodiments of the invention, the server 150 is aware of the location of drivers utilizing instances of the driver application 145. For example, and not by way of limitation, the server 150 may have access to location data of each driver device 140 on which a driver application 145 is active, and this location data may indicate the respective locations of the associated drivers. In some embodiments of the invention, in selecting a driver, the server 150 may consider one or more of the following factors: locations of nearby drivers, estimated time to reach the user for each of the nearby drivers, and number of seats available in the respective vehicles of the nearby drivers as compared to a number of seats indicated in the ride request. For example, and not by way of limitation, the server 150 may simply select the driver who is estimated to be able to reach the user most quickly, or the server 150 may announce the ride request to drivers nearby the pickup user and thus allow a driver to self-select. It will be understood, however, that various mechanisms exist for selecting a driver responsive to a ride request.

At block 213, the server 150 transmits, to the driver application 145 of the driver, information associated with the ride request. In some embodiments of the invention, this transmitted information includes the pickup location.

At decision block 214, the user or the driver, or both, are given the opportunity to change the pickup location. If neither of them opts to change the pickup location, then the method 200 ends with the ride request being fulfilled, at block 221. Specifically, for fulfillment to be achieved, the driver picks up the user at the pickup location, drives to the drop-off location, and drops off the user. The server 150 may then initiate a transfer of funds to pay for the ride. However, the method 200 proceeds to block 215 if either party opts to change the pickup location.

In some embodiments of the invention, modifying the pickup location begins in much the same way as selecting a pickup location as described with respect to blocks 205 through 210. At block 215, the user device 110 captures at least one image of the user's surroundings, and the user application 115 transmits that image to the server 150. At block 216, the analytics engine 155 at the server 150 analyzes the image to identify one or more potential pickup locations in the image. At block 217, upon determining which potential pickup locations are visible in the image, the server 150 determines metadata associated with each such pickup location, where that metadata can include both static and dynamic metadata.

At block 218, the server 150 transmits, to both the user application 115 at the user's user device 110 and the driver application 145 and the driver device 140, indications of the potential pickup locations shown in the image as well as the associated metadata. At block 219, the user application 115 displays the potential pickup locations and metadata to the user, such as through a user-side annotated image, and the driver-application displays the potential pickup locations and metadata to the driver, such as through a driver-side annotated image. In other words, each of the user and the driver has access to a respective annotated image.

As discussed above, each annotated image may indicate recommendations made by the server 150 or made by the user application 115 and the driver application 145. In some embodiments of the invention, recommendations are generated by the server 150, rather than at the respective applications, because this may more efficiently enable both the user application 115 and the driver application 145 to receive the same recommendations. However, because the driver is now known, the recommendations may be based on circumstances of both the user and the driver. In other words, additional considerations may be incorporated into the algorithm used to make recommendations, and thus the weights of some factors may change. If a scoring algorithm is used, then the algorithm may be adapted to consider factors related to the driver, including factors related to the driver's vehicle, for instance. For example, and not by way of limitation, if the vehicle is a large sport utility vehicle, and the only stopping places for a potential pickup location are compact, then that potential pickup location may become less preferable. For another example, if the driver has four-wheel drive, then a potential pickup location that might be difficult to reach for most vehicles may move up within the recommendations because it is now known that the driver's vehicle can handle the drive.

In some embodiments of the invention, the selection system 100 may determine a first set of recommendations based on considerations for the user and may determine a second set of recommendations based on considerations for the driver. To this end, in some embodiments of the invention, for each potential pickup location, the selection system 100 determines both a user score, representing considerations associated with the user and a driver score, representing considerations associated with the driver. Additionally, both sets of recommendations may be available to the respective annotated images in the user application 115 and the driver application. For instance, if the recommendations are grouped and color-coded or pattern-coded according to groups, then for a potential pickup location, the color or pattern associated with the recommendation group of the user may be combined (e.g., superimposed on, blended with, or striped with) the color or pattern associated with the recommendation group for the driver. For example, and not by way of limitation, if green highlighting is used to represent a highly recommended group, then an ideal potential pickup location may be highlighted green with respect to both the user and the driver, and thus will appear to be fully highlighted green in each respective annotated image. In contrast, potential pickup locations that are assigned to varying groups may show mixed colors. As such, both the user and the driver are enabled to easily see which potential pickup locations are highly recommended for both parties.

In some embodiments of the invention, blocks 215 through 229 of FIG. 2B may be performed in real time, thus providing an augmented reality from the user's perspective. When the user moves, thereby pointing the camera 130 of the user device 110 in a different direction, then blocks 215 through 219 may be repeated to present a respective updated annotated image to the user application 115 and to the driver application 145 in real time, or near real time.

At block 220, the user application 115 and the driver application 145 negotiate to determine a pickup location. To this end, in some embodiments of the invention, the server 150 provides a connection between the user application 115 such that the user application 115 displays to the user indications of some or all interactions between the driver and the driver-side annotated image, and the driver application 145 displays to the driver indications of some or all interactions between the user and the user-side annotated image. In this manner, the user and the driver, by way of the user application 115 and the driver application 145, may negotiate to identify a mutually acceptable pickup location. For example, through the server-based connection between the user application 115 and the driver application 145, the user and the driver can exchange messages or connect via a phone call to discuss potential pickup locations. For another example, in some embodiments of the invention, a selection by one party of a potential pickup location is transmitted to the other party's respective application and must be confirmed by the other party, which can lead to a back and forth of selections until a selection is approved by both parties.

In some embodiments of the invention, the driver can indicate to the driver application 145 that the driver opts out of participating in selecting the pickup location. In that case, selection of the pickup location may be made unilaterally by the user at the user application 115. However, the user application 115 may still display information about the driver, and may still provide recommendations that are based on the user as well as the driver. Thus, although the driver application 145 need not participate in the selection in this case, information about the driver, and thus about the driver's vehicle, may still be incorporated into the decision-making process.

At block 221, the ride request is fulfilled. Specifically, for fulfillment to be achieved, the driver picks up the user at the selected pickup location, drives to the drop-off location, and drops off the user. The server 150 may then initiate a transfer of funds to pay for the ride. As such, according to some embodiments of the invention, a ride transaction is executed for the convenience of both the user and the driver, by basing the choice of pickup location on situational awareness and on the dynamic context of the user, the driver, and the environment.

Figure 3:
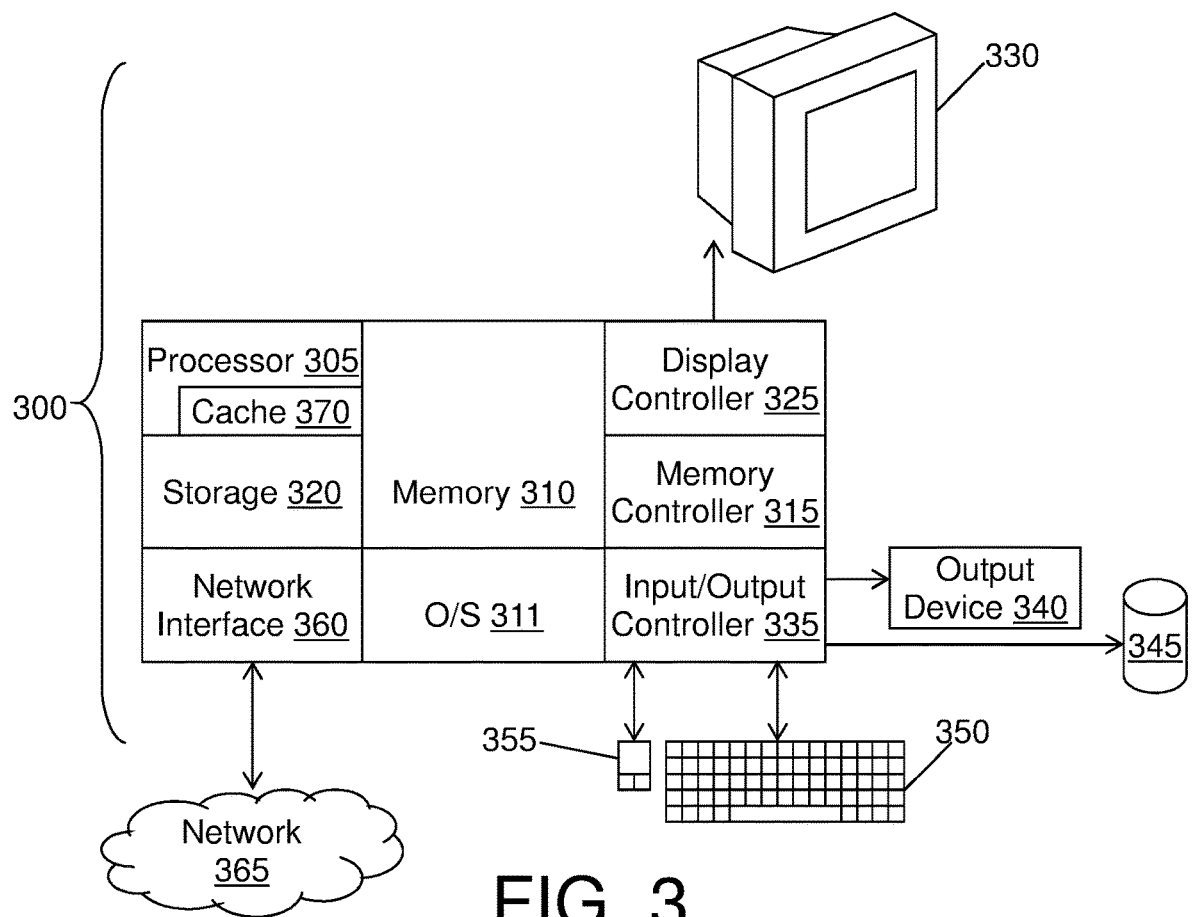
FIG. 3 is a block diagram of a computer system for implementing some or all aspects of the selection system, according to some embodiments of this invention.

FIG. 3 is a block diagram of a computer system 300 for implementing some or all aspects of the selection system 100, according to some embodiments of this invention. The selection systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the selection systems 100 and methods of this disclosure.

The computer system 300 may further include a display controller 325 coupled to a display 120. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Selection systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    capturing an original image by a mobile device requesting a ride for a user in order to identify, in the original image, a plurality of potential pickup locations, the plurality of potential pickup locations being recommended based on whether a street has to be crossed to reach a potential pickup location and a proximity of crosswalks for crossing any street that needs to be crossed;
    associating each potential pickup location of the plurality of potential pickup locations with a respective metadata set of a plurality of metadata sets, wherein the plurality of metadata sets comprise static metadata and dynamic metadata, the static metadata and the dynamic metadata being associated with a field of view of the mobile device requesting the ride for the user, the static metadata comprising disability access, traffic laws, and allowed stopping time;
    generating an annotated image, for display on the mobile device, based on the original image associated with the field of view of the mobile device requesting the ride for the user, wherein the annotated image indicates the plurality of potential pickup locations and the respective metadata set associated with each potential pickup location thereby providing situational awareness to the user, wherein the annotated image highlights all the plurality of potential pickup locations;
    receiving, by the mobile device, a selection of a pickup location from among the plurality of potential pickup locations; and
    transmitting, by the mobile device, the pickup location to a remote server to facilitate the ride beginning at the pickup location, a perspective of the field of view of the mobile device of the user being available to a remote driver application.

2. The computer-implemented method of claim 1, further comprising presenting one or more recommendations in the annotated image, wherein the presenting the one or more recommendations comprises:
    determining a respective user score for each of the plurality of potential pickup locations, based on a set of user factors associated with a user; and
    applying a first set of highlighting, in the annotated image, to at least one potential pickup location based on the respective user score of the at least one potential pickup location.

3. The computer-implemented method of claim 2, wherein the presenting the one or more recommendations further comprises:
    determining a respective driver score for each of the plurality of potential pickup locations, based on a set of driver factors associated with a driver, wherein the driver is distinct from the user; and
    applying a second set of highlighting, in the annotated image, to the at least one potential pickup location based on the respective driver score of the at least one potential pickup location;
    wherein the first set of highlighting is combined with the second set of highlighting.

4. The computer-implemented method of claim 3, further comprising:
    receiving, from the remote driver application assigned to the ride, a selection of a first potential pickup location from among the plurality of potential pickup locations;
    displaying, in the annotated image, the selection of the first potential pickup location; and
    approving the selection of the first potential pickup location.

5. The computer-implemented method of claim 3, wherein the receiving the selection of the pickup location from among the plurality of potential pickup locations comprises facilitating a negotiation with the remote driver application.

6. The computer-implemented method of claim 1, wherein the static metadata does not change or changes infrequently relative to the dynamic metadata, the static metadata and the dynamic metadata both being associated with a location of the user awaiting the ride.

7. The computer-implemented method of claim 1, wherein the annotated image is a panoramic image.

8. A system comprising: a memory having computer-readable instructions; and
  one or more processors for executing the computer-readable instructions, the computer-readable instructions comprising:
    capturing an original image by a mobile device requesting a ride for a user in order to identify, in the original image, a plurality of potential pickup locations, the plurality of potential pickup locations being recommended based on whether a street has to be crossed to reach a potential pickup location and a proximity of crosswalks for crossing any street that needs to be crossed;
    associating each potential pickup location of the plurality of potential pickup locations with a respective metadata set of a plurality of metadata sets, wherein the plurality of metadata sets comprise static metadata and dynamic metadata, the static metadata and the dynamic metadata associated with a field of view of the mobile device requesting the ride for the user, the static metadata comprising disability access, traffic laws, and allowed stopping time;
    generating an annotated image, for display on the mobile device, based on the original image, wherein the annotated image indicates the plurality of potential pickup locations and the respective metadata set associated with each potential pickup location thereby providing situational awareness to the user, wherein the annotated image highlights all or a subset of the plurality of potential pickup locations;
    receiving a selection of a pickup location from among the plurality of potential pickup locations; and
    transmitting the pickup location to a remote server to facilitate a ride beginning at the pickup location, a perspective of the field of view of the mobile device of the user being available to a remote driver application.

9. The system of claim 8, the computer-readable instructions further comprising presenting one or more recommendations in the annotated image, wherein the presenting the one or more recommendations comprises:
  determining a respective user score for each of the plurality of potential pickup locations, based on a set of user factors associated with a user; and
  applying a first set of highlighting, in the annotated image, to at least one potential pickup location based on the respective user score of the at least one potential pickup location.

10. The system of claim 9, wherein the presenting the one or more recommendations further comprises:
  determining a respective driver score for each of the plurality of potential pickup locations, based on a set of driver factors associated with a driver, wherein the driver is distinct from the user; and
  applying a second set of highlighting, in the annotated image, to the at least one potential pickup location based on the respective driver score of the at least one potential pickup location;
  wherein the first set of highlighting is combined with the second set of highlighting.

11. The system of claim 10, the computer-readable instructions further comprising:
  receiving, from the remote driver application assigned to the ride, a selection of a first potential pickup location from among the plurality of potential pickup locations;
  displaying, in the annotated image, the selection of the first potential pickup location; and
  approving the selection of the first potential pickup location.

12. The system of claim 10, wherein the receiving the selection of the pickup location from among the plurality of potential pickup locations comprises facilitating a negotiation with the remote driver application.

13. The system of claim 8, wherein the static metadata does not change or changes infrequently relative to the dynamic metadata, the static metadata and the dynamic metadata both being associated with a location of the user awaiting the ride.

14. The system of claim 8, wherein the annotated image is a panoramic image.

15. A computer-program product for determining a pickup location, the computer-program product comprising a computer-readable storage medium having program instructions embodied therewith, the program instructions executable by a processor to cause the processor to perform a method comprising:
  capturing an original image by a mobile device requesting a ride for a user in order to identify, in the original image, a plurality of potential pickup locations, the plurality of potential pickup locations being recommended based on whether a street has to be crossed to reach a potential pickup location and a proximity of crosswalks for crossing any street that needs to be crossed;
  associating each potential pickup location of the plurality of potential pickup locations with a respective metadata set of a plurality of metadata sets, wherein the plurality of metadata sets comprise static metadata and dynamic metadata, the static metadata and the dynamic metadata being associated with a field of view of the mobile device requesting the ride for the user, the static metadata comprising disability access, traffic laws, and allowed stopping time;
  generating an annotated image, for display on the mobile device, based on the original image, wherein the annotated image indicates the plurality of potential pickup locations and the respective metadata set associated with each potential pickup location thereby providing situational awareness to the user, wherein the annotated image highlights all or a subset of the plurality of potential pickup locations;
  receiving a selection of a pickup location from among the plurality of potential pickup locations; and
  transmitting the pickup location to a remote server to facilitate a ride beginning at the pickup location, a perspective of the field of view of the mobile device of the user being available to a remote driver application.

16. The computer-program product of claim 15, the method further comprising presenting one or more recommendations in the annotated image, wherein the presenting the one or more recommendations comprises:
  determining a respective user score for each of the plurality of potential pickup locations, based on a set of user factors associated with a user; and
  applying a first set of highlighting, in the annotated image, to at least one potential pickup location based on the respective user score of the at least one potential pickup location.

17. The computer-program product of claim 16, wherein the presenting the one or more recommendations further comprises:
  determining a respective driver score for each of the plurality of potential pickup locations, based on a set of driver factors associated with a driver, wherein the driver is distinct from the user; and applying a second set of highlighting, in the annotated image, to the at least one potential pickup location based on the respective driver score of the at least one potential pickup location;

wherein the first set of highlighting is combined with the second set of highlighting.

18. The computer-program product of claim 17, the method further comprising:

receiving, from the remote driver application assigned to the ride, a selection of a first potential pickup location from among the plurality of potential pickup locations;

displaying, in the annotated image, the selection of the first potential pickup location; and approving the selection of the first potential pickup location.

19. The computer-program product of claim 15, wherein the static metadata does not change or changes infrequently relative to the dynamic metadata, the static metadata and the dynamic metadata both being associated with a location of the user awaiting the ride, the plurality of potential pickup locations being recommended based on current traffic on each street that needs to be crossed, obstacles that need to be navigated on a route to the potential pickup location, whether weather shields are present between a user's current location and the potential pickup location, whether the user has luggage that would need to be carried with the user to the potential pickup location, a length of time available for loading or onboarding at the potential pickup location, whether disability access is available, and whether there exists an indoor waiting area for the potential pickup location.

20. The computer-implemented method of claim 1, wherein the dynamic metadata is selected from the group consisting of weather conditions, event information, and temporary blockages.

* * * * *